United States Patent
Ayers et al.

(10) Patent No.: US 8,997,580 B2
(45) Date of Patent: Apr. 7, 2015

(54) ANGLED INSERT MAGNETIC FLOW METER

(75) Inventors: Jared Steven Ayers, Menifee, CA (US);
Gerald E. Davis, Hemet, CA (US);
Clinton Paul Hobbs, Hemet, CA (US);
Eric Dahl Mikkelsen, Hemet, CA (US)

(73) Assignee: McCrometer, Inc., Hemet, CA (US)

( * ) Notice: Subject to any disclaimer, the term of this patent is extended or adjusted under 35 U.S.C. 154(b) by 245 days.

(21) Appl. No.: 13/607,102

(22) Filed: Sep. 7, 2012

(65) Prior Publication Data

US 2014/0069206 A1    Mar. 13, 2014

(51) Int. Cl.
*G01F 1/58*    (2006.01)
*G01F 15/18*    (2006.01)

(52) U.S. Cl.
CPC ............... *G01F 15/18* (2013.01); *G01F 1/588* (2013.01)

(58) Field of Classification Search
None
See application file for complete search history.

(56) References Cited

U.S. PATENT DOCUMENTS

| | | | |
|---|---|---|---|
| 3,529,591 A | 9/1970 | Schuette | |
| 3,775,673 A | 11/1973 | Watanabe | |
| 3,937,080 A * | 2/1976 | Fix et al. | 73/861.15 |
| 4,125,019 A | 11/1978 | Cushing | |
| 4,428,241 A * | 1/1984 | Davis et al. | 73/861.12 |
| 5,814,738 A | 9/1998 | Pinkerton et al. | |
| 7,437,945 B1 | 10/2008 | Feller | |
| 8,136,410 B2 | 3/2012 | Hobbs et al. | |
| 8,136,414 B2 | 3/2012 | Steven | |
| 2011/0162459 A1 | 7/2011 | Hobbs et al. | |
| 2011/0259119 A1 | 10/2011 | Steven | |

FOREIGN PATENT DOCUMENTS

| | | |
|---|---|---|
| GB | 2145232 A | 3/1985 |
| GB | 2453704 | 2/2011 |

OTHER PUBLICATIONS

Written Opinion of the International Preliminary Examining Authority for Application PCT/US2013/058164, Sep. 8, 2014, 10 pages, European Patent Office, Munich, Germany.

* cited by examiner

*Primary Examiner* — Harshad R Patel
(74) *Attorney, Agent, or Firm* — Ference & Associates LLC

(57) ABSTRACT

A flow metering apparatus, includes: a sensor insert body configured to enter a fluid conduit at an angle with respect to a wall of the fluid conduit; at least one electrode mounted on the sensor insert body; and a coil assembly including at least one magnetic coil in the sensor insert body.

17 Claims, 5 Drawing Sheets

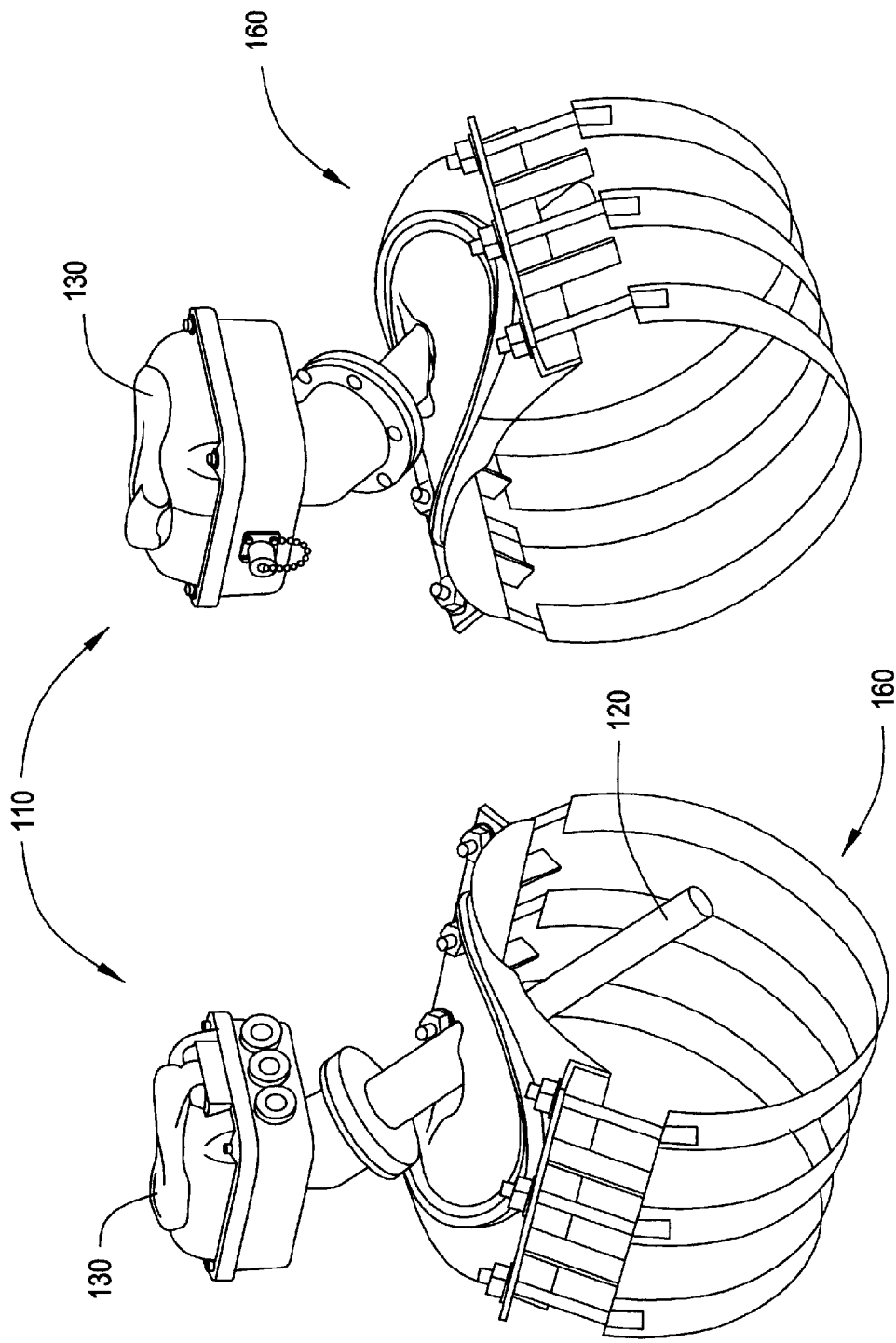

ANGLED INSERT MAGNETIC FLOW METER

BACKGROUND

The subject matter described herein relates generally to magnetic flow meters.

Magnetic flow meters are used to measure the flow of charge-carrier laden fluids, for example water, through a conduit or pipeline. Such flow meters measure the velocity of the fluid moving through the pipeline by using Faraday's Law. Faraday's Law states that a conductor moving through a magnetic field produces a voltage. In this case, the charge-carrier laden fluid acts as a conductor moving though the magnetic field produced by the sensor, thus producing a voltage. The magnitude of the voltage is proportional to the velocity at which the fluid water moves through the magnetic field.

Conventional insertion-type electromagnetic flow meters include electromagnetic coils inside a sensor that produce magnetic fields, and electrodes on the sensor that measure the voltage generated by a fluid moving through those magnetic fields. The planes of the magnetic fields are typically oriented transverse to the flow of fluid so that as conductive fluid passes through the magnetic fields, it induces a voltage measurable by the sensor. Insertion-type electromagnetic flow meters typically include pairs of electrodes that are spaced apart from each other and in electrical contact with the fluid to measure the induced voltage. The measured voltage is used to determine the average velocity of the fluid flowing through the conduit.

Most flow meters thus include a sensor insert or sensor assembly including a magnetic source and one or more sets of electrodes. The sensor assembly is positioned so that the electrodes are in contact with the fluid flowing through the conduit. To obtain an accurate velocity measurement, it is necessary to maintain a magnetic field within the measured region between the electrodes.

Existing flow meters include a body or external component (external to the conduit) and a sensor insert extending into the fluid column perpendicular to the fluid flow. Flow meters incorporate sensing electrodes into the sensor insert, one end of which extends into the fluid and an opposing end extends at least partially into the external body where wiring connected to the electrodes communicates to the external body. The sensor insert may have an interior space therein that includes the magnetic coils to produce the magnetic fields. Appropriate signals from the sensor are provided to meter circuitry to produce flow rate estimates.

BRIEF SUMMARY

In summary, one aspect provides a flow metering apparatus, comprising: a sensor insert body configured to enter a fluid conduit at an angle with respect to a wall of said fluid conduit; at least one electrode mounted on said sensor insert body; and a coil assembly including at least one magnetic coil in said sensor insert body.

Another aspect provides a flow metering apparatus, comprising: a sensor insert body configured to enter a fluid conduit at an angle with respect to a wall of said fluid conduit; meter circuitry in communication with the sensor insert body; at least one electrode mounted on said sensor insert body; and a coil assembly including at least one magnetic coil in said sensor insert body.

A further aspect provides a method of flow metering, comprising: providing a flow metering apparatus about a fluid conduit such that a sensor insert body of the flow metering apparatus enters the fluid conduit at an angle with respect to a wall of said fluid conduit; producing one or more signals with at least one electrode mounted on said sensor insert body responsive to fluid flow within the fluid conduit; receiving the one or more signals at meter electronics of the fluid metering apparatus; and producing a fluid flow estimate using the meter electronics.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 (A-B) illustrates views of an example magnetic flow meter with an angled insert.

DETAILED DESCRIPTION

Figure 1:
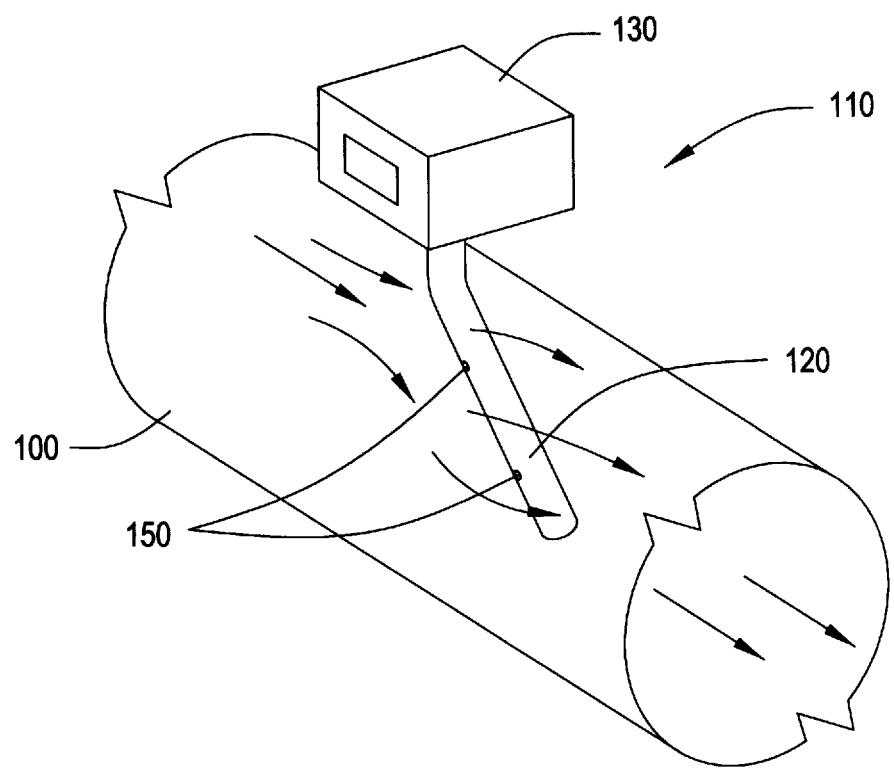
FIG. 1 illustrates an example magnetic flow meter with an angled insert.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Existing magnetic flow meters operate using a sensor inserted into the fluid flow in a perpendicular orientation. A description of such an existing flow meter is found in U.S. Pat. No. 8,136,410, which is incorporated by reference herein. In existing flow meters, a sensor body (containing coils to create magnetic fields and electrode pairs to read the resultant voltages) is oriented in a perpendicular fashion with respect to the fluid flow and the conduit wall in order to maximize the effect of the magnetic fields produced by the coils.

In an embodiment, a sensor insert body 120 of a flow meter assembly 110 is not inserted in a perpendicular fashion, but rather is inserted at an angle with respect to the conduit wall 100. The angle or orientation at which the insert body 120 is provided by embodiments offers several advantages over a perpendicular orientation, as described herein. The internals of the sensor insert body 120 according to the various example embodiments described herein may be similar to prior sensors assemblies, including that found in U.S. Pat. No. 8,136,410.

An embodiment provides that the sensor insert body 120 may be angled at approximately 45-degrees in order to offer a trade off between reduced effect of the magnetic field produced by the coils (transverse orientation of the magnetic field with respect to the flow) and the added benefits provided by the angled sensor insert body 120, as further described herein. Although an angle of about 45-degrees is described herein as an example, other angles may be used. For example, the angle with respect to the wall of the fluid conduit may be between the range of 0-degrees and 90-degrees. Thus, while specific angles and ranges of angles are provided herein as examples, any angle may be chosen that provides the functionality described herein. Particularly, an angle that is less than 90 degrees but greater than 0 degrees may be used, or an angle between 15 degrees and 75 degrees may be used, or an angle between 30 and 50 degrees may be used.

Figure 2A:
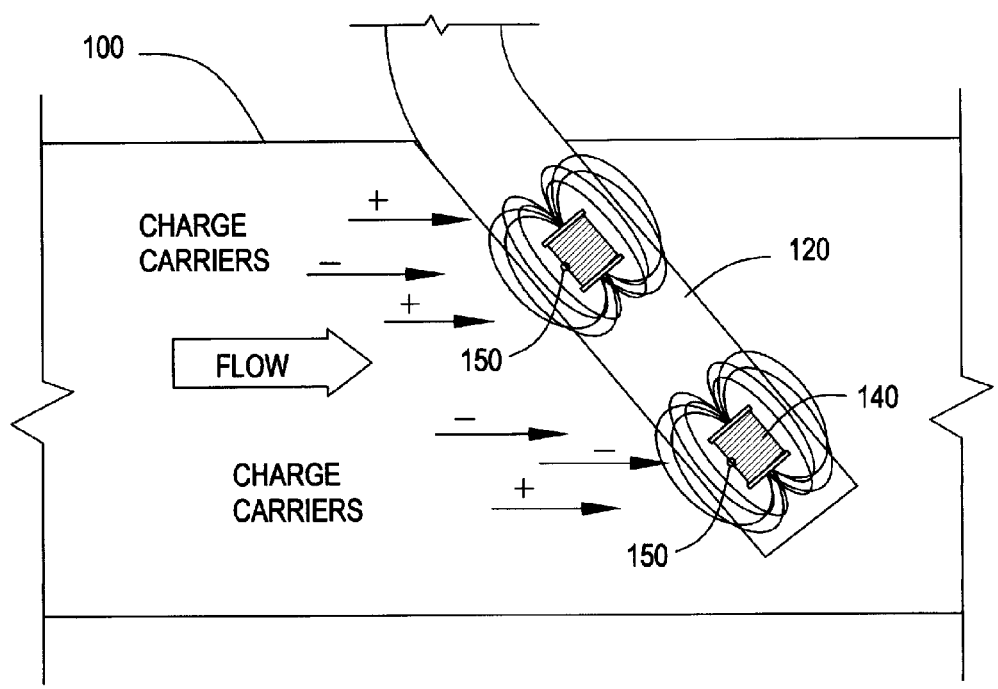
FIG. 2 (A-C) illustrates example components and arrangements thereof for a magnetic flow meter with an angled insert.
Figure 2B:
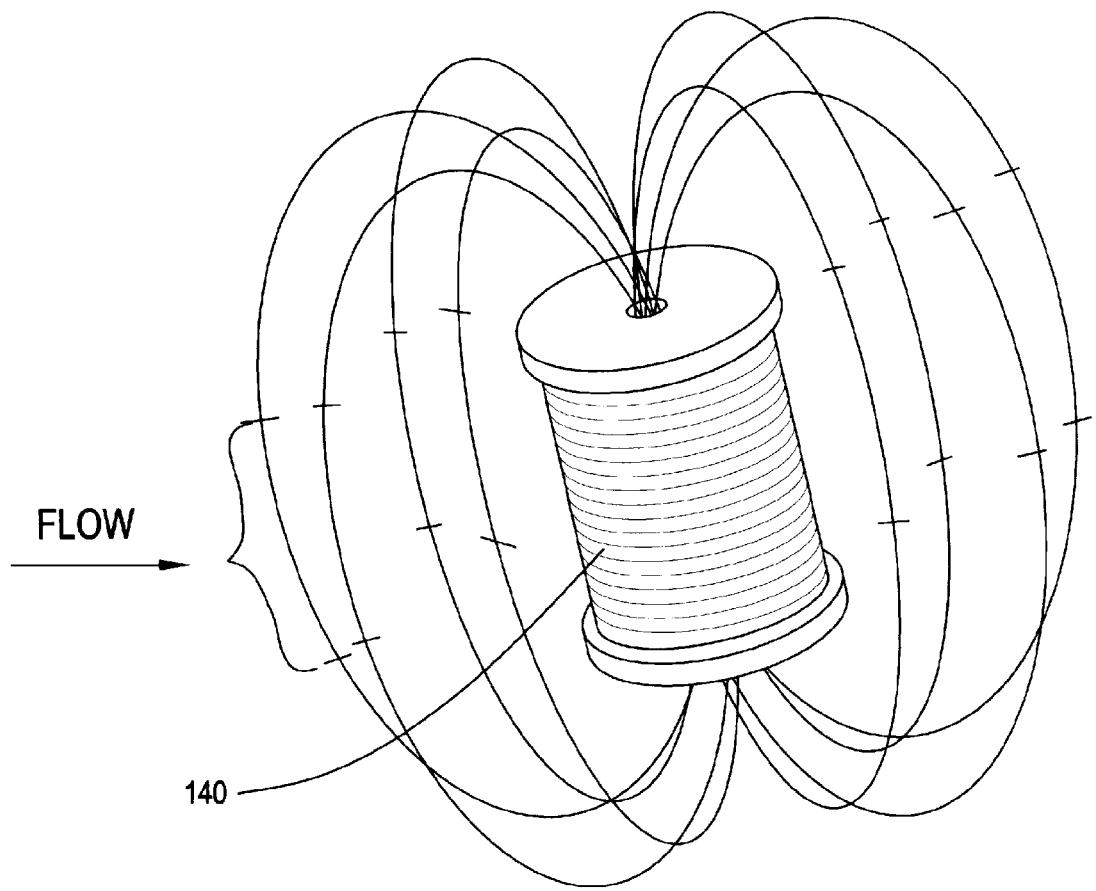
Figure 2C:
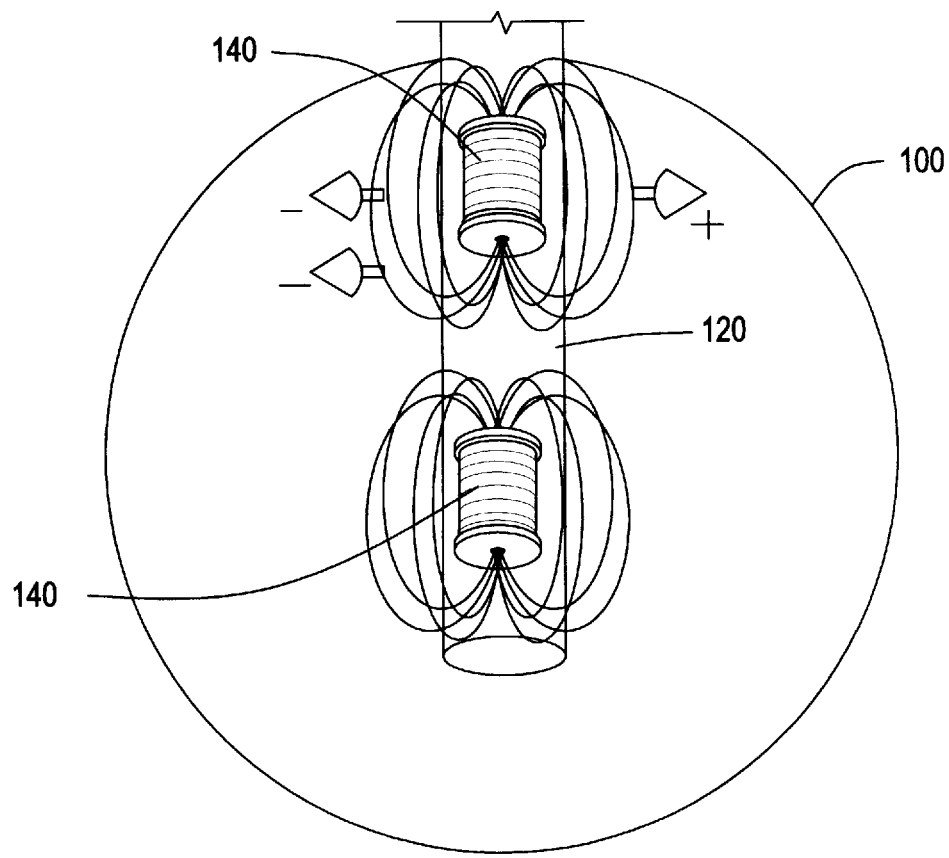

Referring to FIG. 1-FIG. 3, an embodiment includes an elongated, cylindrical sensor insert body 120 that may be made of a moisture impermeable material, such as metal. The sensor insert body 120 has a longitudinal axis with a hollow interior for housing components such as coiling, wiring and the like. In the illustrated example embodiments, the sensor insert body 120 may be cylindrical in shape and may have a generally circular cross-section. It is also contemplated that the sensor insert body 120 may have other suitably shaped cross-sections, for example shapes that reduce disturbance in the fluid flow.

The sensor insert body 120 may be formed of stainless steel, but may be made out of any suitable impermeable, non-magnetic material or combination of such materials. The sensor insert body 120 includes appropriate coiling (bobbins) 140 to create magnetic fields for appropriate sensors/electrodes 150, as further described herein.

A benefit to an angled sensor insert body 120 is that there is additional length as compared to a perpendicular arrangement, which may be used to space electrode 150 and coil 140 arrangements from one another. In the illustrated example embodiments, sensing electrode assemblies 150 and are situated in the fluid flow at designated positions to take measurements of the fluid velocity by way of the voltage potential generated. Another electrode assembly (not shown) provides a reference or ground electrode assembly, which may be positioned appropriately, for example facing upstream of the fluid flow. In an alternative embodiment, electrode assemblies 150 (including ground or reference electrodes) may be positioned in other orientations or positions.

It should be appreciated that for measuring flow in a conduit 100 or open channel, the sensor assembly 110 may have any suitable number of electrode assemblies 150 mounted on the outer surface of the sensor insert body 120. Again, an advantage of increased length of the insert body 120 is the ability to provide adequate spacing between various components, as well as extending the measurement points downstream in multiple cross-sectional planes.

A magnetic coil assembly or coil tree within the sensor insert body 120 includes coils 140 for generating the magnetic fields needed to measure the fluid flow and is configured to be inserted in a hollow interior defined by the sensor insert body 120. A maximum effect (magnetic field) is produced with the magnetic field that has a component that is perpendicular to the fluid flow (FIG. 2B). In an example embodiment, the magnetic coils 140 may included on an elongated rod having a first end and an opposing second end that includes a flange. The magnetic coils 140 may be attached to the rod, which may be made out of metal such as stainless steel, plastic or any suitable material or a combination of materials. Thus, the rod is configured to be inserted in the hollow interior of the sensor insert body 120. The magnetic coils 140 are attached to the rod and spaced accordingly to align with the electrode pairs 150.

An embodiment provides a slanted or angled sensor insert body 120, which, as described herein, provides certain unexpected benefits. As described, the slanted sensor insert body 120 permits a greater length of insertion to cover the cross section of flow in the conduit 100 as compared with a perpendicular arrangement. This creates an advantage in that the sensing electrodes 150 may be spaced further from one another, if desired. When compared to a sensor mounted perpendicular to flow, an advantage especially evident in smaller line (conduit) 100 sizes (diameters) is more room for or separation between coils/electrodes (140, 150). In effect, at an example 45-degree angle, there is over 40% more length along which to space the electrodes and coils (140, 150), thereby permitting more electrode pairs 150 and stronger coils 140 (with more windings on longer bobbins). This additional space yields a significant improvement in performance of the sensor 110 in terms of signal to noise ratio.

By virtue of the fact that the sensor insert body 120 extends into the flow longitudinally and is not confined to the (perpendicular) cross section at the insertion point, as is a sensor inserted perpendicular to flow, the slanted sensor insert body 120 exhibits an ability or characteristic to account for or average flows that vary longitudinally. For example, the angled insert body 120 may account for installations where swirl or other anomalous flow characteristics are evident. In essence, the sensor assembly 110 may average in three spatial dimensions rather than two (as when using a perpendicular insert).

The structural stresses due to flow on the slanted or angled sensor insert body 120 of an embodiment are also much smaller than those experienced by a perpendicularly mounted sensor insert that encounters the flow more abruptly. Because an embodiment provides a slanted sensor insert body 120, the sensor insert body 120 sheds vortices differently than a perpendicularly mounted sensor insert sheds vortices. The slanted sensor insert body 120 is thus far less subject to the establishment of potentially damaging harmonic forces. This allows for a lighter and more economical configuration for the support structure and makes a bolt-on saddle design 160 practical (FIG. 3 A-B).

In part, due to the lighter structural requirements of embodiments employing a slanted or angled sensor insert body 120, the ease and cost of manufacturing sensor assemblies 110 is reduced. Moreover, because the tip or distal end of the sensor insert body 120 in the slanted or angled configuration is farther from the opposite wall of the conduit 100 as compared with a perpendicular insert, one size of sensor 110 can be applied to a wide range of conduit 100 (pipe) diameters within the same pipe size family. Thus, for example an embodiment with a particular sensor insert body 120 would allow for implementation in both OD and thin wall standard piping. This affords an opportunity to provide stock sensors 110 rather than making custom flow meters 110 for each application.

Additionally, a slanted sensor insert body 120 oriented to encounter the flow in a downstream orientation, as illustrated in the example embodiments, has an inherent "debris shedding" capability. This permits installation of the sensor insert body 120 in applications where debris and build-up would normally foul the electrodes 150 on a sensor insert mounted perpendicular to the flow.

Accordingly, the embodiments provide a slanted or angled sensor insert body 120 for measuring the flow of a conduit 100 using magnetically induced voltages. The various embodiments permit for using a slanted insert body 120 to avoid several problematic characteristics of perpendicular insert arrangements.

It will be readily understood that an embodiment may include an appropriately equipped information handling device or other computer or circuitry, termed herein meter electronics or meter circuitry, that provides the functionality described herein with respect to flow estimation or measurement. Moreover, embodiments or components thereof may be implemented as a system, method, apparatus or computer program product. Accordingly, various embodiments may take the form of an entirely hardware embodiment or an embodiment combining software and hardware aspects. Furthermore, embodiments may take the form of a program product embodied in one or more device/computer readable medium(s) having program code embodied therewith.

In this regard a non-limiting example of meter electronics and related components 130 includes appropriate input and output interfaces for communicating with the sensor insert body 120 to receive one or more signals, as well as for communicating with other devices and components. Meter electronics 130 thus include one or more processors, memory, and internal system communication means (buses), as well as appropriate interfaces for communicating data and other information to components, whether integral to meter electronics 130 (such as an embedded display panel) or operatively connected therewith, in the case of remote devices or a distributed system. As a non-limiting example, a processor of meter electronics 130 receives one or more signals from the sensor insert body 120, which may be modified (converted, amplified, et cetera), and may process these signals according to predetermined routine(s) to produce as output one or more flow estimates for fluid flow in the conduit 100. The output may be provided to a display device or other connected device.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A flow metering apparatus, comprising:
    a slanted sensor insert body configured to enter a fluid conduit at an angle with respect to a wall of said fluid conduit;
    at least two electrodes mounted on said slanted sensor insert body; and
    at least two coil assemblies, each of which include at least one magnetic coil in said slanted sensor insert body, wherein the at least two coil assemblies are aligned along a slanted axis according to the slanted sensor insert body;
    said at least two electrodes and at least two coil assemblies positioned on said slanted sensor inert body such that at least two measurement points downstream in multiple cross-sectional planes are obtained.

2. The flow metering apparatus of claim 1, wherein the angle with respect to the wall of the fluid conduit is between the range of 0-degrees and 90-degrees.

3. The flow metering apparatus of claim 1, wherein the slanted sensor insert body is angled downstream with respect to the flow of fluid within the fluid conduit.

4. The flow metering apparatus of claim 1, wherein the slanted sensor insert body includes an outer surface and the at least two electrodes are mounted on the outer surface.

5. The flow metering apparatus of claim 1, further comprising an external component of the flow metering apparatus secured to the fluid conduit using a bolt-on saddle design.

6. The flow metering apparatus of claim 1, further comprising meter circuitry in communication with the slanted sensor insert body.

7. The flow metering apparatus of claim 6, wherein the at least two electrodes provide signals to the meter circuitry in communication with the slanted sensor insert body.

8. The flow metering apparatus of claim 7, wherein the meter circuitry is configured to utilize the signals to provide a flow rate estimate of fluid flowing through the fluid conduit.

9. A flow metering apparatus, comprising:
    a slanted sensor insert body configured to enter a fluid conduit at an angle with respect to a wall of said fluid conduit;
    meter circuitry including a processor and a memory in communication with the slanted sensor insert body;
    at least two electrodes mounted on said slanted sensor insert body; and
    at least two coil assemblies, each of which include at least one magnetic coil in said slanted sensor insert body, wherein the at least two coil assemblies are aligned along a slanted axis according to the slanted sensor insert body;
    said at least two electrodes and at least two coil assemblies positioned on said slanted sensor inert body such that at least two measurement points downstream in multiple cross-sectional planes are obtained.

10. The flow metering apparatus of claim 9, wherein the angle with respect to the wall of the fluid conduit is between the range of 0-degrees and 90-degrees.

11. The flow metering apparatus of claim 9, wherein the slanted sensor insert body is angled downstream with respect to the flow of fluid within the fluid conduit.

12. The flow metering apparatus of claim 9, wherein the slanted sensor insert body includes an outer surface and the at least two electrodes are mounted on the outer surface.

13. The flow metering apparatus of claim 9, further comprising an external component of the flow metering apparatus secured to the fluid conduit using a bolt-on saddle design.

14. The flow metering apparatus of claim 9, wherein the at least two electrodes provide signals to the meter circuitry in communication with the slanted sensor insert body.

15. The flow metering apparatus of claim 14, wherein the meter circuitry is configured to utilize the signals to provide a flow estimate of fluid flowing through the fluid conduit.

16. A method of flow metering, comprising:
providing a flow metering apparatus about a fluid conduit such that a slanted sensor insert body of the flow metering apparatus enters the fluid conduit at an angle with respect to a wall of said fluid conduit;
said slanted sensor insert body including at least two electrodes positioned on said slanted sensor inert body and at least two coil assemblies aligned along a slanted axis according to the slanted sensor insert body such that at least two measurement points downstream in multiple cross-sectional planes are obtained;
producing signals with at least two electrodes mounted on said slanted sensor insert body responsive to fluid flow within the fluid conduit;
receiving the signals at meter electronics including a processor and a memory of the flow metering apparatus; and
producing a fluid flow estimate using the meter electronics.

17. The method of flow metering of claim 16, wherein the angle with respect to the wall of the fluid conduit is between the range of 0-degrees and 90-degrees.

* * * * *